(12) United States Patent
Rottmerhusen

(10) Patent No.: US 7,923,947 B2
(45) Date of Patent: Apr. 12, 2011

(54) ELECTROMOTIVE POWER STEERING

(75) Inventor: Hans Hermann Rottmerhusen, Tellingstedt (DE)

(73) Assignee: Audi AG, Ingolstadt (DE)

( * ) Notice: Subject to any disclaimer, the term of this patent is extended or adjusted under 35 U.S.C. 154(b) by 846 days.

(21) Appl. No.: 11/630,331

(22) PCT Filed: Jun. 21, 2005

(86) PCT No.: PCT/DE2005/001107
§ 371 (c)(1),
(2), (4) Date: Dec. 21, 2006

(87) PCT Pub. No.: WO2006/000193
PCT Pub. Date: Jan. 5, 2006

(65) Prior Publication Data
US 2007/0257631 A1    Nov. 8, 2007

(30) Foreign Application Priority Data
Jun. 24, 2004   (DE) .......................... 10 2004 030 459

(51) Int. Cl.
*H02P 3/18*    (2006.01)
*H02P 3/22*    (2006.01)
(52) U.S. Cl. ..................................... 318/254.1; 318/701
(58) Field of Classification Search .................. 318/700, 318/701, 704, 254.1, 246; 310/179, 180, 310/184, 152, 198, 166, 168
See application file for complete search history.

(56) References Cited

U.S. PATENT DOCUMENTS

| | | | |
|---|---|---|---|
| 4,355,342 A | 10/1982 | Franzolini | |
| 4,733,113 A * | 3/1988 | Smith | 310/49.33 |
| 4,748,362 A * | 5/1988 | Hedlund | 310/168 |
| 4,918,347 A * | 4/1990 | Takaba | 310/179 |
| 5,355,069 A * | 10/1994 | Bahn | 318/701 |
| 5,386,162 A * | 1/1995 | Horst | 310/51 |
| 5,517,415 A | 5/1996 | Miller et al. | |
| 5,701,066 A | 12/1997 | Matsuura et al. | |
| 5,866,964 A | 2/1999 | Li | |
| 6,194,849 B1 | 2/2001 | Wilson-Jones et al. | |
| 6,422,335 B1 * | 7/2002 | Miller | 180/446 |
| 6,798,161 B2 * | 9/2004 | Suzuki | 318/434 |
| 6,810,986 B2 * | 11/2004 | Takagi | 180/446 |
| 7,023,166 B1 * | 4/2006 | Kohen et al. | 318/727 |
| 7,239,061 B2 * | 7/2007 | Huang et al. | 310/211 |
| 2002/0047460 A1 * | 4/2002 | Yoneda et al. | 310/216 |
| 2002/0060105 A1 * | 5/2002 | Tominaga et al. | 180/443 |
| 2002/0139606 A1 * | 10/2002 | Williams et al. | 180/446 |
| 2004/0186641 A1 * | 9/2004 | Hironaka et al. | 701/42 |

(Continued)

FOREIGN PATENT DOCUMENTS
DE    198 41 710 A1    4/1999
(Continued)

*Primary Examiner* — Walter Benson
*Assistant Examiner* — Eduardo C. Santana
(74) *Attorney, Agent, or Firm* — Novak Druce + Quigg LLP

(57) ABSTRACT

Disclosed is an electromotive power steering for a motor vehicle, in which a special type of reluctance motor or series wound motor is used while such an electric motor is electronically commutated. In order to recognize an error condition in the electronic control device and the electric motor, adequate mechanisms are provided in the circuit arrangement (15), the electric motor being cut from the power source by means of a relay (16) or by short-circuiting the power source downstream of a safety device (17) with the aid of a thyristor (18).

16 Claims, 3 Drawing Sheets

U.S. PATENT DOCUMENTS

Figure 1:
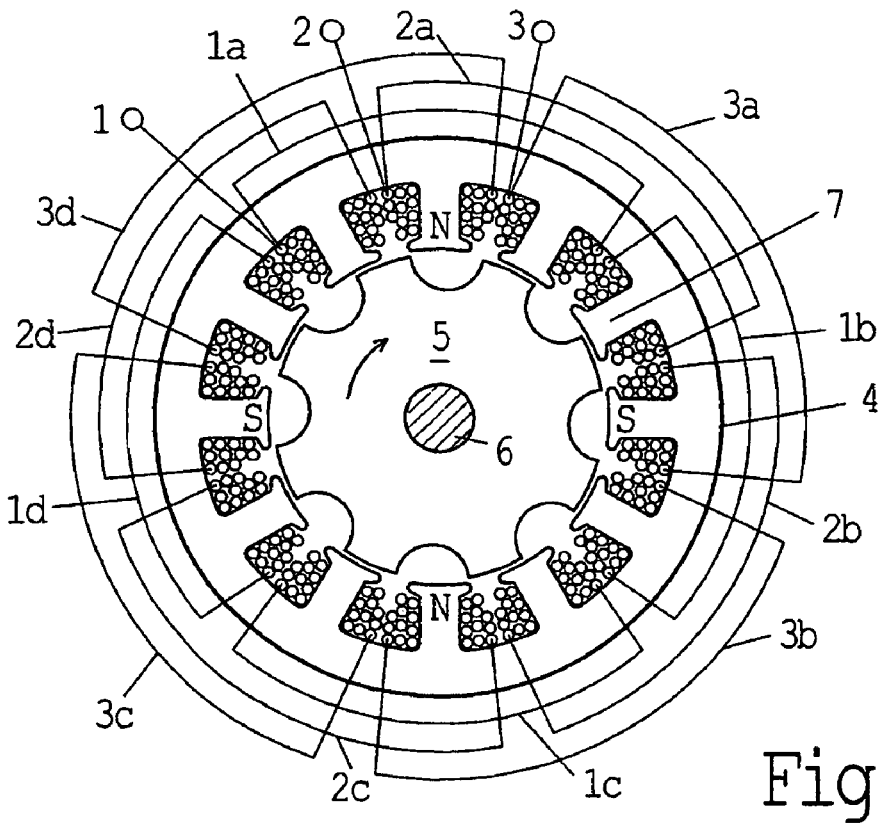

2006/0138883 A1 * 6/2006 Yagai et al. .................... 310/71
2007/0252543 A1 * 11/2007 Rottmerhusen ............... 318/254

FOREIGN PATENT DOCUMENTS

| DE | 101 24 436 A1 | | 11/2002 |
| EP | 337645 | | 10/1989 |
| EP | 710600 | | 5/1996 |
| EP | 1006039 | | 6/2000 |
| EP | 1316494 | | 6/2003 |
| FR | 2473229 A | * | 7/1981 |
| WO | PCT/US02/09890 | | 3/2002 |
| WO | WO 2008092801 A2 | * | 8/2008 |

* cited by examiner

US 7,923,947 B2

ELECTROMOTIVE POWER STEERING

This application is a U.S. National Stage of PCT/DE2005/001107, having been filed Jun. 21, 2005, which claims priority from DE 102004030459.9-09, having been filed on Jun. 25, 2004, each of which is hereby incorporated by reference in its entirety.

The invention is based on an electromotive power steering for a motor vehicle, the electric motor being switched off in the event of an error (DE 198 41 710 A1).

In motor vehicles electric motors are being used with greater frequency as back up or as main drive of a servocontrol assembly.

Electromotive drives such as these require very high starting and torque in both directions of rotation. An electronically commuted PM motor meets these requirements.

PM excited motors do, however, present the disadvantage that, in the event of a malfunction of the motor, despite separation from the current source, the motor effects braking torque when the control is actuated, since the motor is short-circuited by way of a defective electronic actuating system and acts as a generator and thus operates in the direction opposite that of the direction of steering of the vehicle. This creates the danger that the vehicle may no longer be steered properly. Appropriate devices are provided in order to prevent such danger. But such devices have safety problems of their own.

DE 101 24 436 A1 discloses an electromotive power steering containing an electric motor and an auxiliary electronic control assembly. The motor is a synchromotor with permanently excited rotor. In the rotor of the synchromotor there is, in addition to the permanent magnets, a field excitation winding through which current flows in the event of an error so that it generates a magnetic flux in the direction opposite that of the permanent magnet poles. As a result of this measure the braking torque caused by short-circuiting of the synchromotor is reduced or prevented in the event of an error.

U.S. Pat. No. 6,194,849 B1 also discloses an electromotive power steering with a PM-complemented motor. In it a switch on the stator windings of the electric motor is opened in the event of an error so that current can no longer flow into it and the electric motor does not generate a disruptive load moment.

Separation of a conventional synchromotor with permanently excited motor from the steering stator by means of a coupling in the event of an error is also known.

DE 198 41 710 A discloses an electromotive power steering with electric motor and an electronic device for commutation of the electric motor. An error detection unit which among other things evaluates the signals from a torque sensor mounted on the steering column is switched, as a function of the type and extent of the error, to a first error mode, in which the support action of the electric motor is more or less halved, or to a second mode, in which the electric motor mode is switched off.

U.S. Pat. No. 5,517,415 discloses an electromotive power steering having a torque sensor whose signals are evaluated for detecting an error event. In the event of an error the torque signal of the electric motor is reduced to a minimum value.

US 2002/0173890 A1 also discloses an electromotive power steering having a torque sensor whose signals are evaluated for detecting an error event. The electric motor is switched off in the event of detection of an error event.

The invention is based on the object of proposing an electromotive power steering in which the electric motor has a power steering in which the electric motor exhibits high starting torque and torque in both directions of rotation and in which the electronic control unit of the electric motor is provided with a protection unit in the event of an error in the control unit and/or the electric motor.

This object is accomplished by the characteristics set forth in claims 1 and 2. Other configurations of the invention are presented in the dependent claims.

The solution claimed for the invention presents the advantage that an electromotive power steering has been developed in which a special electric motor produces a very high starting torque and torque in both directions of rotation in each rotor position, the electronic control unit of the electric motor being provided with an appropriate device which in the event of an error in the electronic control device in the electric motor separates the electric motor of the power steering from the current source.

The solution also presents the advantage that, after separation of the electric motor from the current source in the event of an error, the electric motor does not act as a generator and the rotor of the electric motor itself applies no braking torque, since the motor is not assembled with permanent magnets.

Figure 2:
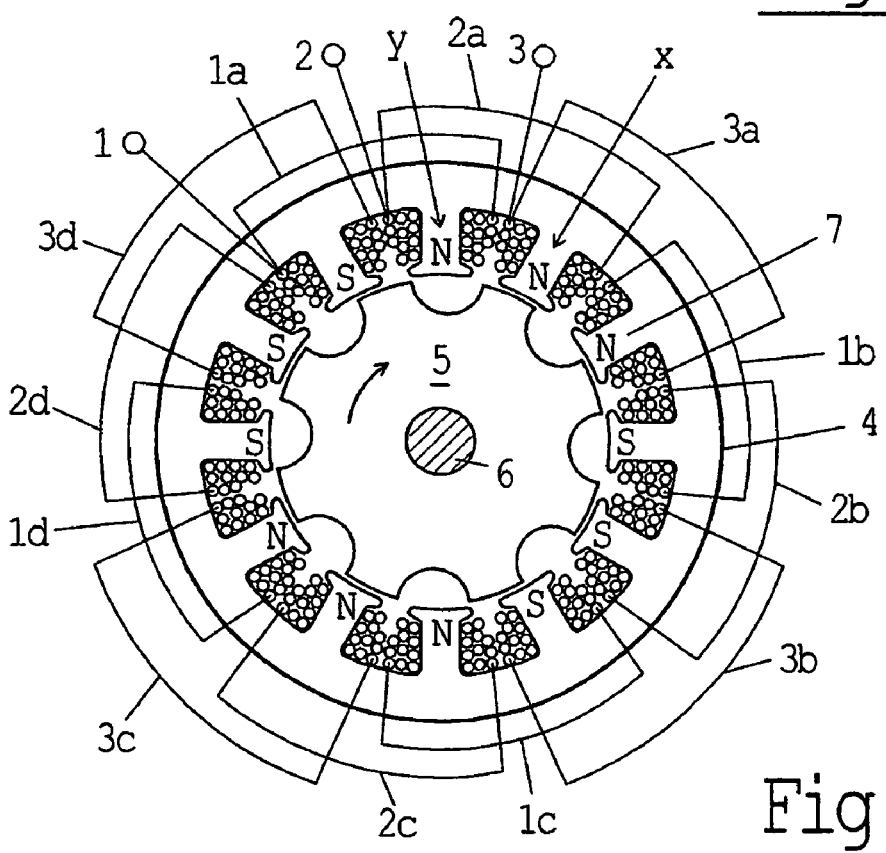
Figure 3:
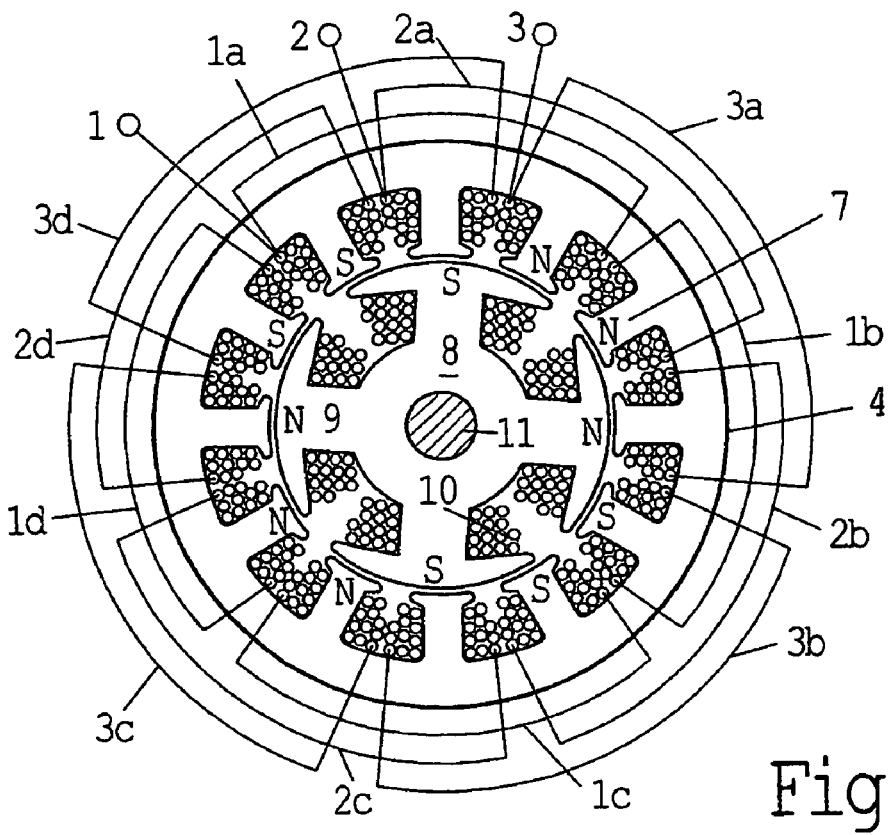
Figure 4:
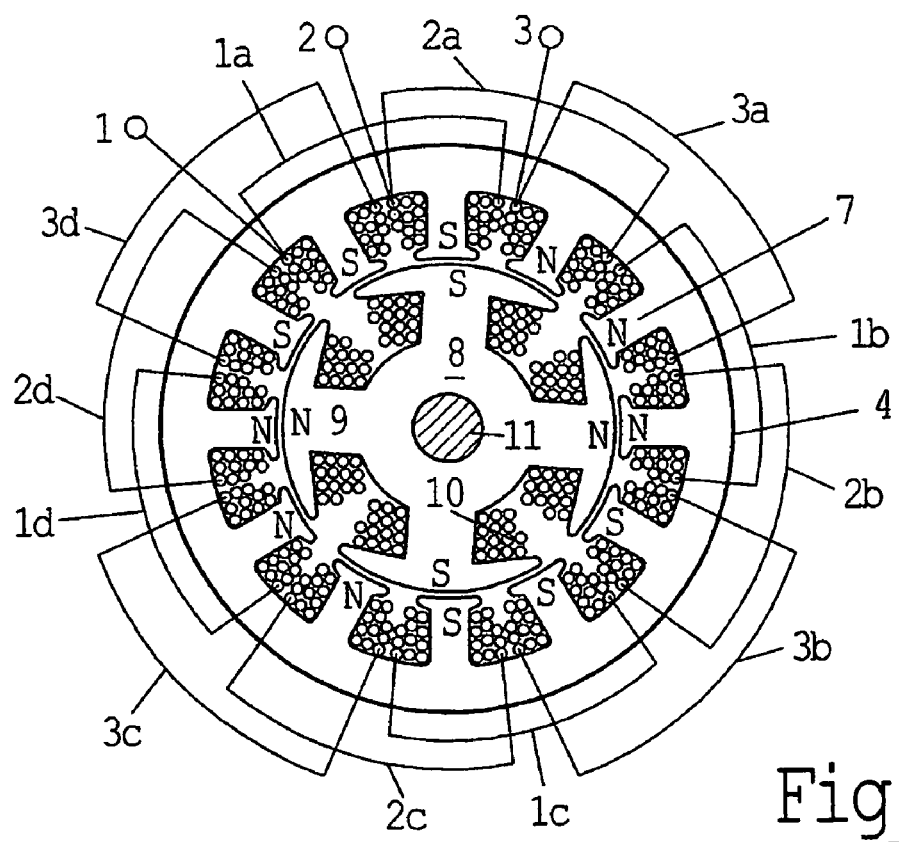
Figure 5:
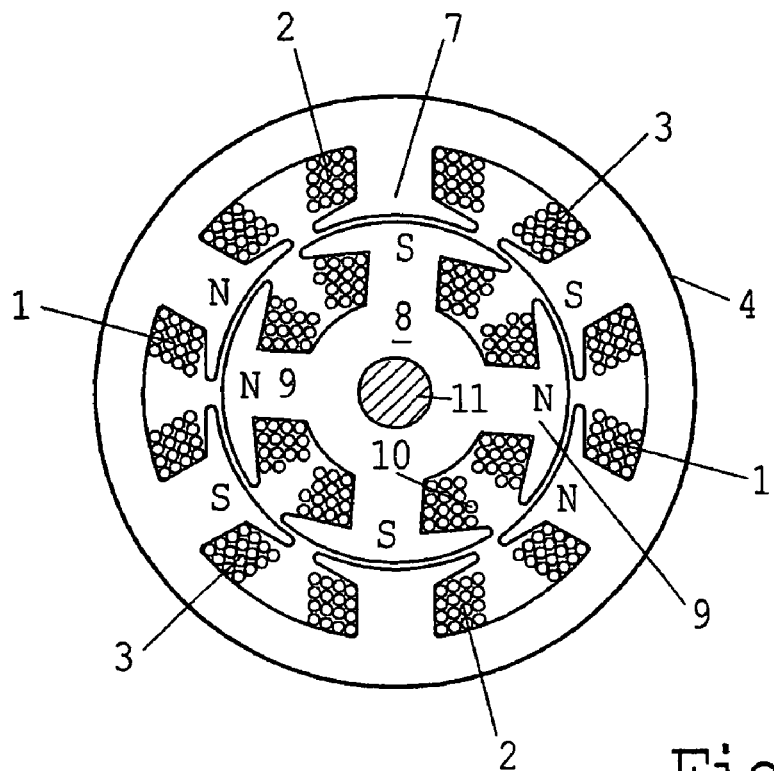
Figure 6:
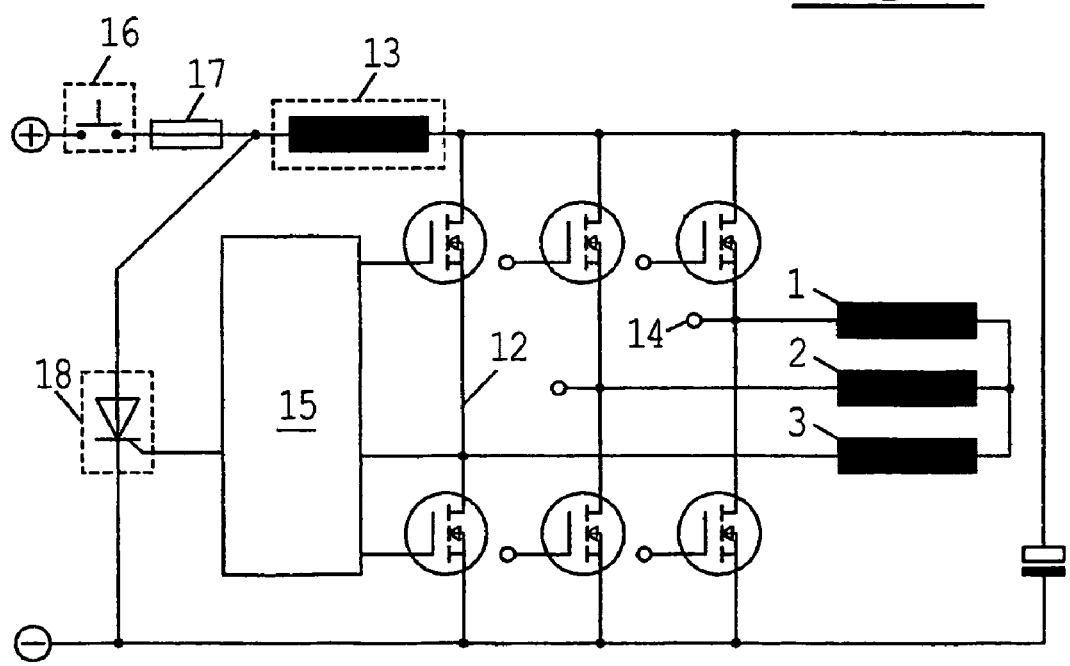

The invention is described in detail in what follows with reference to the drawing, in which FIG. 1 presents an axial elevational view of the stator and rotor of a reluctance motor, FIG. 2 an axial elevational view of the stator and rotor of another reluctance motor, FIG. 3 an axial elevational view of the stator and rotor of an inverse-speed motor, FIGS. 4 and 5 axial elevational views of the stator and rotor of other inverse-speed motors, FIG. 6 a circuit configuration of the electronic control unit for commutation of the reluctance motor and the inverse-speed motor.

FIG. 1 shows a vertical elevational view of a reluctance motor with the branches 1, 2, 3 of the field winding on the stator 4 and with an eight-pole rotor 5 on the shaft 6. In a four-pole configuration of the winding phases 1, 2, 3 the stator has twelve stator teeth 7 aligned with the rotor and each of the winding phases has four coils identified as a, b, c, d. Each of the winding phase coils encloses three stator teeth 7, the four coils of a winding phase being positioned side by side on the stator, while the side of one coil and one side of the adjacent coil are positioned in a common groove.

The winding phases are connected to a current source so that formation of a pole toward the stator is effected on every third stator tooth 7, two winding phases being superimposed on two-thirds of the field of the coils a, b, c, d, for which purpose a standard circuit configuration of the electronic control device is associated with the reluctance motor. In FIG. 1 the winding phases 2 and 3 are connected to a current source and pole formation is identified as N and S. On the other hand the winding phases are connected to a current source so that a pole to the rotor is formed on two adjacent stator teeth, which adjacent to each other exhibit the same pole formation, by one-third of the field of the coils a, b, c, d, of two winding phases being superimposed, and the winding phases are retained in a star connection, for which purpose a bridge circuit of the electronic control device is associated with the reluctance motor. In a junction of winding phases and current source such as this a circular rotary field is formed on the stator.

FIG. 2 presents an axial elevational view of the reluctance motor in which each of the coils a, b, c, d of the winding phases 1, 2, 3 encloses two stator teeth 7 and the space between one coil and the next coil of a winding amounts to that of one stator tooth and the winding phases are retained in a star connection, every formation of a pole toward the rotor being effected by central pole formation of the respective pole fields. Pole formation is identified as N and S. In this instance as well a circular rotary field is formed by means of a bridge circuit of the electric control unit on the stator during commutation of the winding phases.

In this configuration of the coils of the winding phases on the stator no superimposition of the coils a, b, c, d takes place and torque is applied to each rotor tooth during switching from one rotor step to the next rotor step. FIG. 2 illustrates this rotor position.

Central pole formation of the respective pole fields is identified by an x, the corresponding polarization on each stator tooth being already present for the next central pole formation y for the next rotor step.

A configuration such as this of the coils a, b, c, d of the winding phases 1, 2, 3 on the stator and the corresponding wiring results in achievement of high starting torque and uniform torque in each rotor position of each rotor during rotor revolution. This effects quiet running behavior of the motor.

A configuration such as this of the winding phases on a stator in a reluctance motor results in very high energy density on the respective stator teeth, so that high starting torque and high torque on the rotor are achieved, and accordingly a reluctance motor such as this is used to advantage in power steering.

A stator structure such as that shown in FIGS. 1 and 2 with the appropriate configuration of the winding phases on the stator for a reluctance motor is also used to advantage in a series motor.

FIGS. 3 and 4 illustrate such a series motor. The rotor 8 has four rotor teeth 9 on which the coils 10 of the exciter winding are mounted, and each of the coils 10 of the exciter winding encloses a rotor tooth. The exciter winding is connected to slip rings which are mounted on the shaft 11 of the rotor 8. The configuration of the coils a, b, c, d of the winding phases 1, 2, 3 for the series motor corresponds to the configuration of the winding phases in the reluctance motor (FIGS. 1 and 2), the winding phases in a series motor always being retained in a star connection. As is shown in FIG. 3, each of the coils a, b, c, d of the winding phases 1, 2, 3 encloses three stator teeth 7. In this instance the winding phases are connected to a current source so that each of the coils is superimposed to the extent of one third and the pole formation on the stator shown in FIG. 3 results when the winding phases 2 and 3 are connected to a current source.

In FIG. 4 each of the coils a, b, c, d of the winding phases 1, 2, 3 encloses two stator teeth 7; no superposition of the coils is present, pole formation to the rotor being effected on one stator tooth. Current is supplied to the winding phases by way of a bridge circuit of the series motor so that a circular rotary field is formed on the stator.

FIG. 5 presents a vertical elevational view of another series motor with the branches 1, 2, 3 of the field winding on the stator 4. In this instance each of the coils of the winding phases encloses a stator tooth 7. The rotor 8 corresponds to the rotor shown in FIGS. 3 and 4. In this instance as well the winding phases extend to a star connection, a bridge circuit of the electronic control device being associated with the winding phases, and a circular rotary field is formed on the stator.

The series motors of the special kind have, in addition to high starting torque and torque, uniform torque in each position of rotor rotation. The motors described in the foregoing may also be configure with any desired number of pole pairs.

The motors of the special kind cited in the foregoing may be operated with the same circuit configuration of the electronic control device.

FIG. 6 illustrates a circuit configuration of the electronic control device for commutation of the winding phases of the reluctance motor and the series motor. Each of the winding phases 1, 2, 3 is connected to one end on a transistorized half-bridge 12, while the winding phases are star connected to the other end. The excitation winding 13 of the rotor of the series motor is connected upstream from the half-bridges. In order that occurrence of an error on the half-bridges of the electronic control device or in the motor may be rapidly detected, a measuring shunt may be connected between the half-bridges 12 and the winding phases 1, 2, 3, or on each of the half-bridges 12 and the winding phases 1, 2, 3, or may be located on the half-bridges 12, there is a potential tap 14. By preference, for detecting an error in the electric control unit or in the motor the information of the signals from a torque sensor provided on the control column can also be used. When the control unit 15 detects an error on the half-bridges 12 or in the motor, the motor is separated from the current source either by means of a relay 16 or by short-circuiting of the current source downstream from a safety device 17 by means of a thyristor 18. In the case of the reluctance motor short-circuiting of the current source by a thyristor in the event of an error in the bridge circuit is not necessary, since the current source may be short-circuited directly by way of the half-bridges in the event of a defect in the half-bridges.

In the electromotive drives proposed in the foregoing for a power steering, the reluctance motor and the series motor as generator are ineffective in the event of an error, nor does the rotor of these motors apply braking torque, since the rotor is not provided with permanent magnets. In contrast, a motor with a rotor provided with permanent magnets exerts braking torque even if the motor is separated from the current source.

Use may be made by preference of transistors for detecting an error on the half-bridges or in the motor, transistors in which self-detection of the functional capability of the transistors is incorporated in the transistors, or the functional capability is monitored by the control unit 15.

The invention claimed is:

1. Electromotive power steering for a motor vehicle, having an electronic control device for commutation of the winding phases of the electric motor, the electric motor being a reluctance motor in which each of the coils of the winding phases encloses a plurality of stator teeth, and the winding phases are, during operation of the motor, in contact with a current source wherein in each instance central pole formation toward the rotor occurs, and that, for the purpose of detecting an error event in the electronic control device and/or in the reluctance motor the information of the signals from a torque sensor provided on the steering column being simultaneously used, such information being conducted for evaluation to the control unit of the electronic control device and, in the event of an error event is separated from the current source by means of short-circuiting of the current source downstream from a safety device by means of a thyristor.

2. The electromotive power steering as claimed in claim 1, wherein each of the coils of the winding phases encloses three stator teeth, the coils of the winding phases being mounted side by side on the stator and one side of one coil and one side of a coil of adjacent coils of a winding phase, being positioned in a common groove.

3. The electromotive power steering as claimed in claim 1, wherein each of the coils of the winding phases encloses two stator teeth and the winding phases are retained in a star connection, each pole formation to the rotor occurring on three adjacent stator teeth with the same polarity and a circular rotary field being present on the stator.

4. The electromotive power steering as claimed in claim 1 further comprising transistors in which self-detection of the functional capability of the transistors is integrated into the transistors, or the functional capability of the transistors is monitored by the control unit.

5. The electromotive power steering as claimed in claim 1 further comprising measurement shunts mounted in the electronic control unit and in the electric motor for the purpose of detecting an error event in the circuit configuration.

6. The electromotive power steering as claimed in claim 1 further comprising potential taps mounted in the electronic control unit and in the electric motor for the purpose of detecting an error event in the circuit configuration.

7. Electromotive power steering for a motor vehicle, having an electronic control device containing a bridge circuit, for the purpose of commutation of the winding phases of the electric motor, the electric motor being an electronically commutated series motor or a reluctance motor in which, on the stator, each of the coils (a, b, c, d) of the winding phases (1, 2, 3) encloses a plurality of stator teeth or one stator tooth, and each of the coils of the excitation winding of the rotor encloses a rotor tooth (9), and the winding phases are during operation of the motor in contact with a current source wherein in each instance formation of a central pole to the rotor occurs, and wherein, for the purpose of detecting an error event in the electronic control unit, signals from a torque sensor provided on the steering column are used simultaneously, such signals being conducted for the purpose of evaluation to the control unit of the electronic control device, and in the event of an error the series motor is separated from the current source by means of short-circuiting of the current source downstream from a safety device by means of a thyristor.

8. The electromotive power steering as claimed in claim 7, wherein each of the coils of the winding phases encloses three stator teeth, the coils of the winding phases being mounted side by side on the stator and one side of one coil and one side of a coil of adjacent coils of a winding phase, being positioned in a common groove.

9. The electromotive power steering as claimed in claim 8, wherein the winding phases of the reluctance motor or of the series motor are in contact with a current source wherein each formation of a pole toward the rotor occurs on every third stator tooth, a standard circuit configuration for a reluctance motor being associated with the electronic control device.

10. The electromotive power steering as claimed in claim 8, wherein the winding phases of the reluctance motor or of the series motor are in contact with a current source wherein each formation of a pole to the rotor occurs on two adjacent stator teeth of the same polarity, the circuit configuration of the electronic control device containing a bridge circuit and the winding phases having a star circuit and a circular rotary field being generated on the stator.

11. The electromotive power steering as claimed in claim 7, wherein each of the coils of the winding phases encloses two stator teeth and the winding phases are retained in a star connection, each pole formation to the rotor occurring on three adjacent stator teeth with the same polarity and a circular rotary field being present on the stator.

12. The electromotive power steering as claimed in claim 7 further comprising transistors in which self-detection of the functional capability of the transistors is integrated into the transistors, or the functional capability of the transistors is monitored by the control unit.

13. The electromotive power steering as claimed in claim 7 further comprising measurement shunts mounted in the electronic control unit and in the electric motor for the purpose of detecting an error event in the circuit configuration.

14. The electromotive power steering as claimed in claim 7 further comprising potential taps mounted in the electronic control unit and in the electric motor for the purpose of detecting an error event in the circuit configuration.

15. An electromotive power steering for a motor vehicle comprising: a reluctance motor comprising: a stator having at least four poles and a plurality of winding phases, each winding phase comprising four coils and three stator teeth, wherein adjacent winding phases share a common coil a rotor having eight poles on a shaft, such that pole formation toward the rotor takes place on every third stator tooth by two-thirds of the field of the coils, and a thyristor downstream from a safety device, wherein said reluctance motor is operatively decoupled from a current source by means of short-circuiting by means of the thyristor.

16. The electromotive power steering of claim 15, further comprising a circular rotary field on the stator.

* * * * *